United States Patent [19]

Rumell

[11] 4,202,494
[45] May 13, 1980

[54] RAIL MOUNTING METHOD AND APPARATUS

[76] Inventor: James A. Rumell, 6643 Winnock, Lakewood Village Apts., Indianapolis, Ind. 46220

[21] Appl. No.: 803,590

[22] Filed: Jun. 6, 1977

[51] Int. Cl.² .................. B27K 3/10; B27K 3/15; E01B 3/02
[52] U.S. Cl. ............................ 238/83; 238/84; 249/91; 264/278
[58] Field of Search ............. 238/83, 84, 308, 315, 238/349, 377, 29, 107; 249/86, 91; 29/429, 469; 264/275, 278

[56] References Cited

U.S. PATENT DOCUMENTS

| | | | |
|---|---|---|---|
| 1,036,860 | 8/1912 | Kull | 238/84 |
| 1,047,404 | 12/1912 | Goltra | 238/83 |
| 1,150,578 | 8/1915 | Cornell | 238/377 |
| 2,040,824 | 5/1936 | Armstrong | 238/349 |
| 3,366,995 | 2/1968 | Dijken et al. | 249/91 |
| 3,429,506 | 2/1969 | Triplett | 238/349 |
| 3,813,040 | 5/1974 | Heinemeyer | 238/84 |
| 3,933,334 | 1/1976 | Edwards | 249/91 |
| 4,047,663 | 9/1977 | Reynolds et al. | 238/349 |

FOREIGN PATENT DOCUMENTS 861929 11/1966 Canada .................. 238/84

Primary Examiner—Robert R. Song
Assistant Examiner—Ross Weaver
Attorney, Agent, or Firm—Leydig, Voit, Osann, Mayer & Holt, Ltd.

[57] ABSTRACT

A long life railroad track and tie arrangement and method of making same. A wooden railroad tie is impregnated and covered with a thin layer of polypropylene which serves to protect the tie both from the weather and from mechanical abuse. The tie is apertured to receive rail mounting hardware. A bottom plate is secured to the underside of the tie and carries threaded fastening means mating the tie apertures. A top plate overlies the tie, carries a channel for receiving the rail, and is apertured to mate the tie apertures. A pair of apertured clips have extended arms overlying the prepositioned rail. Bolts are passed through the clips, the top plate, the tie and into the fasteners in the bottom plate to reliably secure the rail to the tie. In addition to its application in conventional track laying or track repairing situations, the invention allows manufacture of track in transportable prefabricated track and tie sections, which may be positioned and joined on site by simply welding adjacent rails.

12 Claims, 8 Drawing Figures

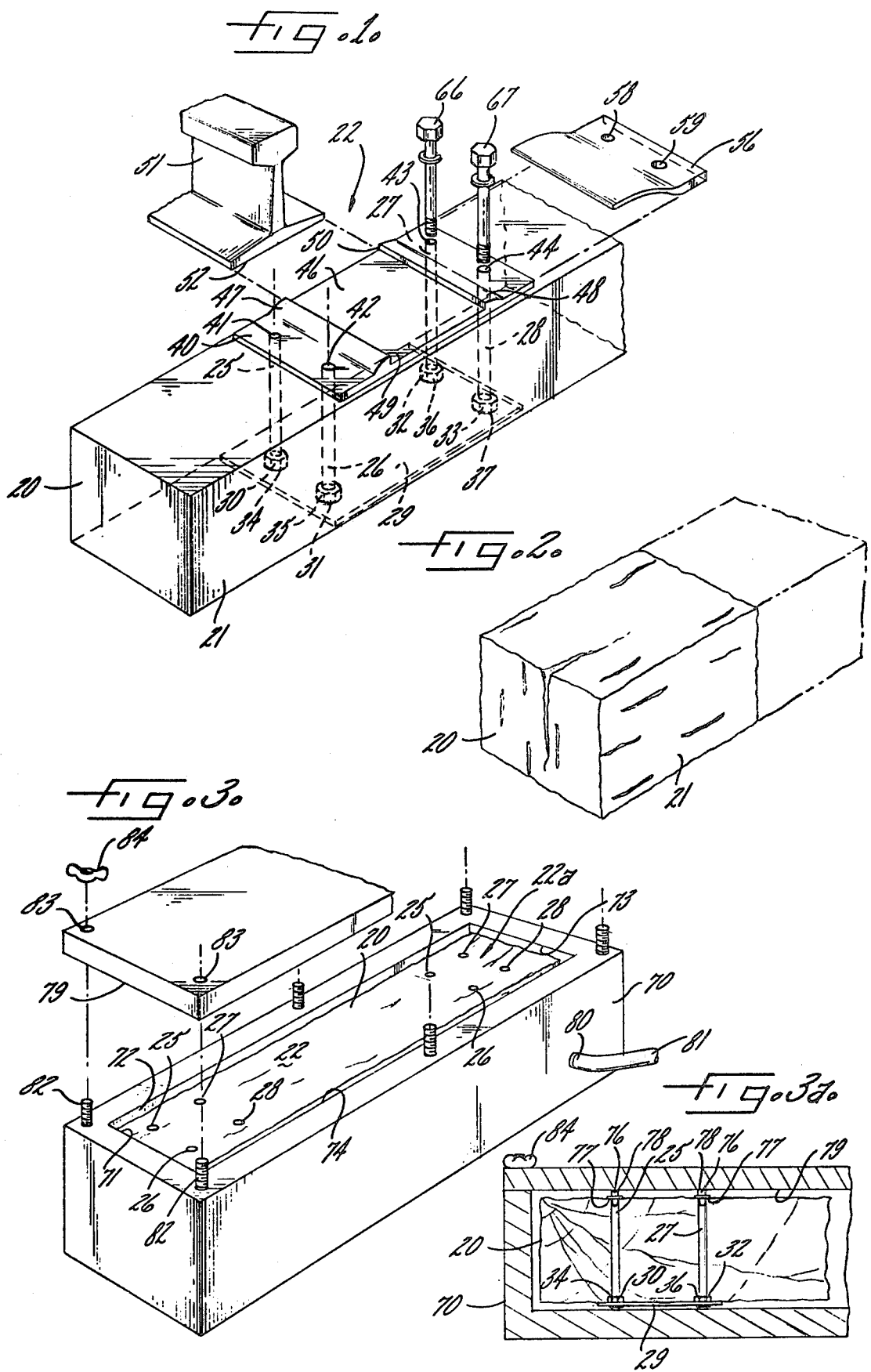

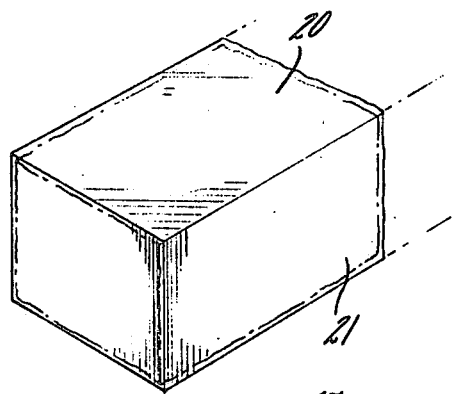
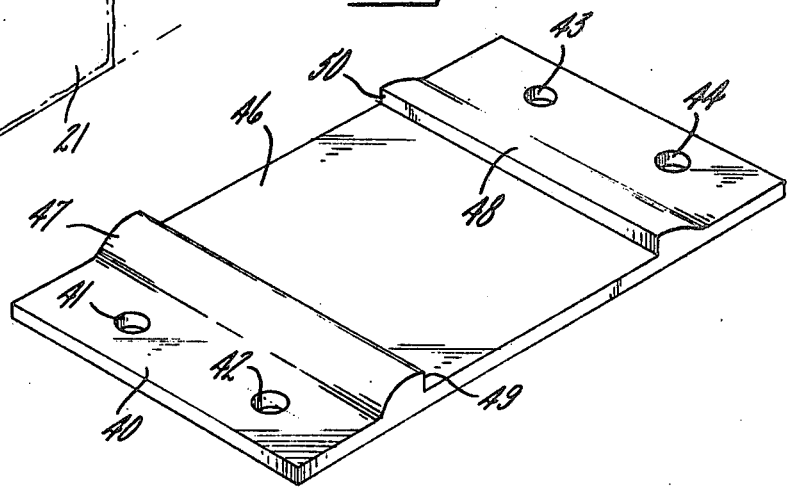
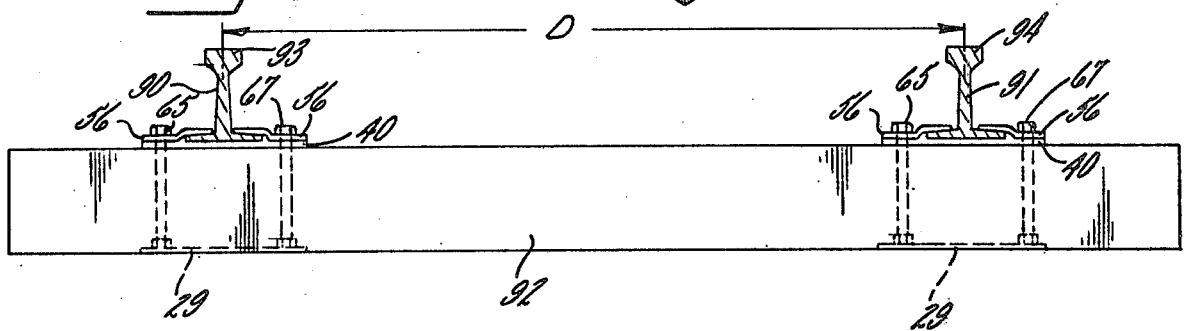
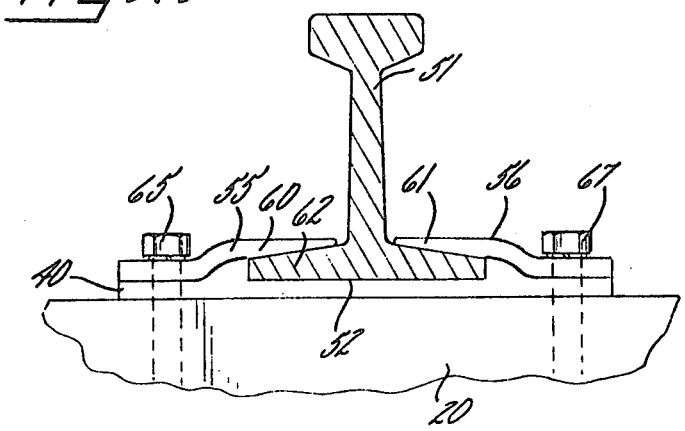

RAIL MOUNTING METHOD AND APPARATUS

This invention relates to railroad track and tie arrangements, and more particularly to a mounting arrangement and method using wooden railroad ties.

For many years, it has been the common and accepted practice in the railroad industry to mount tracks on wooden ties, and to secure the track in position on the tie by means of metal spikes. In some cases, the metal spikes are simply driven into the tie with the head of the spike engaging the lower flange of the rail. In other cases, the track is held in position on the tie by means of a support plate secured to the tie by the spikes.

In service, each time the wheels of a railroad car pass over a tie, the weight of the car forces the track, or any supporting base plate, downwardly relative to the metal spikes which secure the track to the tie. After the wheels of the railroad car pass, the rail returns to its rest position. Each of these cycles exerts a force on the spike which tends to force or pry it a minute distance out of the tie. Repeated cycles tend to raise the spike an appreciable distance out of the tie, and may, after a period, completely disengage the spike from the tie.

In order to insure the safety of rail travel, the railroad operating companies engage in expensive track maintenance programs. As part of these programs, crews are sent out to periodically survey the tracks, and to reseat by way of a sledge hammer any spikes which have become partly or totally disengaged. It is noted that simply pounding the spikes back into the tie is not completely satisfactory because the spikes rely on the gripping action of the tie, and this action is decreased with each loosening and reseating cycle. At any rate, if the maintenance program is not followed rigidly, or if loose spikes are overlooked, the spikes can ultimately become completely dislodged so that the track is in an unsecure condition, a condition which can result in a derailment.

A further problem in using conventional wooden railroad ties is that the ties tend to become weathered, cracked and worn after a period of use, and must be replaced on a regular basis. Because of the millions of ties which must be replaced each year by the railroads, the cost of track maintenance is substantial, and creates a significant drain on the national resources of the nation due to the amount of lumber involved.

To overcome the last mentioned disadvantage, the railroad companies have been investigating fabricated railroad ties, including those made from concrete and from compressed wood chips. It appears, to date, that such ties have been less successful than the conventional wooden tie in providing the necessary strength coupled with the necessary resilience to meet the severe service and climatic conditions to which they are exposed. Additionally, economics is a significant factor; that is, even though the price of wooden ties is accelerating, they are still less expensive than the fabricated ties.

In view of the foregoing, it is a general sim of the present invention to provide a railroad track and tie arrangement having the service characteristics of wooden tie sections, but being safer and requiring less maintenance.

In accomplishing that aim, it is an object to provide a clamping arrangement for positively clamping a railroad track section to a supporting tie.

A further object is to provide a method for treating railroad ties, whether they be new or partly worn, so as to render then useful for many years of further service.

In greater detail, an object is to impregnate and coat a wooden railroad tie with a protective material to increase its resistance to both climatic conditions and mechanical abuse.

Other objects and advantages will become apparent from the following detailed description when taken in conjunction with the drawings in which:

FIG. 1 is a perspective view showing a tie, rail, and mounting arrangement exemplifying the present invention;

FIG. 2 is a perspective view showing a partly worn, untreated railroad tie;

FIG. 3 is a perspective view schematically illustrating apparatus for treating the railroad tie of FIG. 2;

FIG. 3a is a fragmentary sectional view illustrating the manner in which the railroad tie is supported in the mold of FIG. 3;

FIG. 4 is a perspective view illustrating the railroad tie of FIG. 2 after treatment;

FIG. 5 is a perspective view showing the top plate of the mounting arrangement;

FIG. 6 is an end elevation showing a pair of rails mounted in position on a treated tie; and FIG. 7 is a framentary view on an enlarged scale illustrating one of the mounting arrangements of FIG. 6.

While the invention will be described in connection with certain preferred embodiments, there is no intent to limit it to those embodiments. On the contrary, the intent is to cover all alternatives, modifications and equivalents included within the spirit and scope of the invention as defined by the appended claims.

Turning now to the drawings, FIG. 1 illustrates the various elements of the preferred rail mounting apparatus. A railroad tie 20 of conventional wooden construction is preferably, although not necessarily, impregnated and protected by a thin layer 21 of polypropylene or the like. The tie 20, at the rail mounting location 22 is apertured to receive the rail mounting hardware. In the illustrated embodiment, four apertures 25–28 are formed at the rail mounting location 22, as by drilling. Seated below the tie is a lower mounting plate 29 carrying thread engaging means 30–33, affixed to the plate 29 at four locations mating the tie apertures 25–28. Preferably the thread engaging means 30–33 are conventional locking type nuts affixed to the plate 29 as by welding. In order to allow the upper surface of the plate 29 to bear against the underside of the tie, the apertures 25–28 are countersunk at their lower end. This can be accomplished, for example, by forming the holes 25–28 by means of a drill shouldered to automatically produce countersunk areas 34–37 as the last step of the drilling operation.

For receiving the rail and providing a bearing surface between the rail and the tie, a top plate 40 is provided having apertures 41–44 mating the tie apertures. The upper surface of the top plate 40 provides a channel 46 by virtue of raised beads 47, 48 having inwardly facing substantially vertical faces 49, 50. A conventional railroad track or rail 51, having a flat bottom 52, is easily seated in the channel, with the edges thereof butting the faces 49, 50 as illustrated in FIG. 7.

For holding the prepositioned rail in the channel, a pair of mounting clips 55, 56 are provided (FIG. 7), only clip 56 being shown in FIG. 1. Each clip is provided with a pair of apertures, for example, clip 56 has apertures 58, 59, spaced by a distance equal to that between the tie apertures 27, 28. As best shown in FIG. 7, the clips 55, 56 carry formed arms 60, 61 offset so as to rise above the abutments 47, 48 on the top plate and overlie the lower flange 62 of the rail 51. Attachment means preferably in the form of bolts 64–67 are provided to pass through the mated apertures in the clips, the top plate, the tie and into the locking nuts in the bottom plate. Tightening of the bolts serves to pull the upper bearing surface of the lower plate into engagement with the tie and to seat the clips 55, 56 so as to hold the lower flange of the rail 62 in the channel 46. The clips 55, 56 are somewhat resilient in nature, sometimes being referred to as spring clips. Their resilient nature allows the mounting arrangement to tolerate, without damage, inherent track movement, such as harmonic movement caused by the passage of a train, or expansion/contraction caused by temperature changes. Once the arrangement is securely tightened, the rail is held in position, the locked engagement of the bolts with the nuts serving to securely hold the rail and prevent disengagement of the clamped arrangement.

It will be appreciated that the procedure for securing the rail is relatively straightforward, and eliminates the exertion previously required in driving spikes into the tie. Preferably the bottom plate 29 is secured to the tie in a preliminary operation, with the lock nuts being protected within the countersunk recesses provided therefor. As will become more apparent, it is preferred that the bottom plate be secured to the tie by means of a protective polypropylene coating. However, if desired, other means may be used. In fact, the lower plate may be only loosely attached to the tie, the weight of the tie serving to hold it in position during the attaching operation. At any rate, with the bottom plate and tie located in the desired orientation, the top plate is positioned over the mating apertures, and the rail set in the channel provided therefor. The spring clips are laid in position, and bolts passed through all of the mated apertures and threaded into the locking nuts in the lower plate. The bolts are then torqued into secure engagement with the nuts to draw the top and bottom plates toward each other and firmly mount the rail. It is noted that with the entire upper surface of the bottom plate 29 bearing against the lower surface of the tie, the force exerted by the four bolts is distributed across the entire face of the lower plate, reducing the tendency for the bolts to pull through the tie.

While the mounting arrangement described above is useful in connection with wooden railroad ties in general, in the preferred long life embodiment of the invention, the tie, prior to installation is provided with a protective coating in order to increase its resistance both to mechanical abuse and weather conditions. One of the features of this treatment method is that it not only applies to new railroad ties prior to their first use, but also to ties which have been in service for a time and have started to weather. Such a tie is shown in FIG. 2.

Before the protective coating is applied to the tie, it is preferred to drill the apertures for the rail mounting hardware as a preliminary operation. Such apertures 25–28 are shown drilled in the tie 20 of FIG. 3 at rail mounting locations 22 and 22a. Following the drilling operation, the lower plate is positioned with the lock nuts located within their respective countersunk apertures as shown in FIG. 3a. The tie is then placed in a closely fitting mold 70, schematically illustrated in FIG. 3. The mold 70 is sized to be slightly larger than the tie, and includes means for holding the planar surfaces of the tie in spaced relationship from the corresponding surfaces of the mold. To that end dowel pins 76, 76a are provided, affixed to the cover and to the floor of the mold respectively and positioned to engage the tie apertures. The dowel pins 76, 76a are of sufficient diameter to fit very tightly into the tie apertures and are shouldered as at 77, 77a to provide surfaces to engage the lips of the apertures for forming a seal during the subsequent coating operation. Preferably the dowel pins 76a are shorter than pins 76 to accommodate for the thickness of bottom plate 29. To allow for ready removal of the dowel pins after completion of the coating operation, the pins are securely affixed to the respective mold members as by welding at 78, 78a. With the tie thus fixed in position in the mold, a small space on the order of $\frac{1}{8}$ to $\frac{3}{8}$ inches is created between the side walls 71–74 of the mold and the corresponding surfaces of the tie (FIG. 3), as well as above and below the tie (FIG. 3a).

To allow the introduction of the protective coating material, the mold is provided with at least one inlet aperture 80 having a hose or other conduit 81 connected thereto. With the cover tightly secured in position to withstand pressure (this feature being schematically illustrated in FIG. 3 by studs 82 passing through apertures 83 in the cover, and wing nuts 84 clamping the arrangement together), hot polypropylene is introduced into the mold via the conduit 81. The polypropylene is at a temperature sufficient to allow it to flow, so that it fills all of the spaces between the tie and the mold, thereby completely covering the tie. The polypropylene is injected under high pressure, for example at a pressure of about 1600 tons per square inch, such that the material not only fills all of the aforementioned spaces, but actually impregnates any cracks or crevices in the tie. Approximately 40 lbs. of polypropylene injected into the mold will serve to adequately protect the tie, and extend its useful life for many years.

After injection of the hot polypropylene, the mold is transferred, such as by means of a suitable conveyor, to a cooling station, for example a cooling tank or water spray area, which reduces the temperature of the polypropylene to solidify or cure same. The result is the entire tie is coated with a thin layer, such as $\frac{1}{8}$ to $\frac{3}{8}$ inches of polypropylene, the layer not only adhering to the surface of the tie, but also impregnating any cracks or crevices. Following the cooling operation, the cover is removed from the mold and the tie extracted to provide a fully protected unit ready for installation. Removal of the cover from the mold withdraws the dowel pins 76, and removal of the tie withdraws the dowel pins 76a. Ease of removal is enhanced by lubricating the mold in conventional fashion prior to placing the tie. The tie is now prepared for the installation of the mounting hardware. In this case, the polypropylene serves as the means for securing the bottom plate in position on the tie.

The polypropylene coated tie has several features which make it superior to a wooden tie alone. Initially, the tie does have the strength and resilience of wood, thereby avoiding many of the problems associated with prefabricating ties. Secondly, the polypropylene layer forms a continuous coating, preventing the entry of moisture into cracks in the tie. It is noted that when moisture is allowed to enter cracks, expansion and contraction due to freeze-thaw cycles aggravates cracking and substantially shortens the tie life. Also, rotting problems are minimized. In addition, the polypropylene surface is inherently flexible or resilient, so as to resist chipping or damage, and to protect the encapsulated tie from mechanical abuse. Finally, when using the protected tie taught herein in conjunction with the preferred mounting hardware, the problems associated with loosening spikes are eliminated providing a long lasting safe and secure arrangement which requires far less maintenance on the part of the railroad operating companies.

FIG. 6 illustrates a pair of rails 90, 91 mounted on a tie 92, with the upper flanges 93, 94 of the rails spaced by a predetermined distance D. Using the mounting arrangement taught herein, the distance D may be accurately set at the factory, and tie and rail sections prefabricated for transportation to the installation site. For example, a pair of rails 93, 94 about 39 feet in length may be installed on the appropriate number of ties in the factory, with the distance D being accurately maintained. The entire assembly may then be lifted onto a truck or flat-car for transportation to the site. At the site, the sections are simply lowered into place, whereupon adjacent sections are joined simply by welding the rails. The mounting arrangement taught herein is an important factor in allowing the rail sections to be prefabricated in a factory under controlled conditions. More specifically, the positive clamping of the rail mounting arrangement, by virtue of the bolted connections, secures the rail at each rail mounting point such that there is no danger of loosening at any of the mounting points during lifting or transportation. It is noted that with the conventional railroad spike approach, it would not be possible to prefabricate sections because the spikes would tend to unseat during lifting and transportation.

In addition to this approach of prefabricating track and tie sections, the apparatus and technique taught herein are clearly applicable to the more conventional track laying or track repair procedures. More specifically, in installing new track sections, the ties can be laid on the prepared bed, the rails placed in position, then secured with the mounting apparatus taught herein. Furthermore, the instant ties and mounting apparatus can be substituted for faulty ties in an existing track section during normal maintenance.

It will now be apparent that what has been provided is an improved method and means for mounting railroad tracks. The ties are treated in a relatively inexpensive process which substantially lengthens the useful life of the tie. The rails are securely clamped in predetermined positions in such a manner that the possibility of loosening is substantially reduced. Finally, the method allows the manufacture of prefabricated sections in a factory rather than on site, increasing economy and reducing the time necessary to lay new or replacement track sections.

I claim as my invention:

1. A method of extending the life of wooden railroad ties comprising the steps of providing a mold having a cavity for receiving the tie, supporting the tie within the cavity and closing the cavity with the respective planar surfaces of the tie spaced from associated walls of the cavity, providing a source of polypropylene at a temperature sufficiently high to allow said polypropylene to flow, injecting said polypropylene into the cavity under pressure so as to cause said polypropylene to fill any voids and cracks in the tie to form a thin protective layer on all planar surfaces of the tie, the thickness of the protective layer being defined by the spacing between the planar surfaces of the tie and the respective walls of the cavity, cooling the polypropylene to cure the protective coating, and removing the treated tie from the mold.

2. The method as set forth in claim 1 which includes, prior to the step of supporting, the steps of forming apertures in said tie for rail mounting hardware, and plugging said apertures to prevent the entry of polypropylene thereinto.

3. A method of making a railroad track assembly including a pair of rails attached to a railroad tie, comprising the steps of coating the tie with a layer of thermoplastic material that impregnates and fills any voids and cracks therein and forms a relatively thin protective layer on all planer surfaces thereof, forming apertures in the railroad tie at each rail attachment point, providing apertured rail mounting hardware for each rail attachment point including a bottom plate, a top plate having a width substantially the same as the tie and formed with a channel and rail securing clips having a width substantially equal to the top plate, securing the bottom plate to the underside of the tie, locating the top plate on top of the tie, positioning a rail in the channel in the top plate, overlying the clips over the rail and top plate, and bolting through the clips, top plate and tie to the bottom plate to secure the rail to the tie.

4. The combination set forth in claim 3 in which said thermoplastic coating is polypropylene.

5. The method as set forth in claim 3 wherein the step of securing the bottom plate to the tie includes inserting the tie and positioned bottom plates in a mold having a cavity slightly larger than the tie, closing the mold with the planar surfaces of the tie spaced from the corresponding walls of the cavity, providing a source of polypropylene at a temperature sufficient to allow said polypropylene to flow, injecting the polypropylene into the mold under pressure so that said polypropylene impregnates any voids or cracks in the tie, forms a protective layer over the planar surfaces of the tie and secures the bottom plates to the tie.

6. The method as set forth in claim 4 wherein the apertures in the tie are formed prior to the step of impregnating, and including inserting plug means into said apertures for preventing the introduction of polypropylene thereinto.

7. A rail fastening arrangement comprising a wooden tie impregnated and coated with a layer of polypropylene for extending the useful life thereof, a base plate carrying threaded fastening means, a tie having apertures mating the fastening means on the base plate, the base plate being secured to the underside of the tie with the fastening means mating said apertures, a top plate located on top of the tie and having apertures mating said tie apertures, the top plate including means forming a channel for receiving the bottom of the rail, clip means having apertures mating the tie apertures and extended arms overlying said channel and the rail positioned therein, bolt means passing through the clip apertures, the top plate apertures and the tie apertures into the threaded fastening means on said bottom plate, whereby engagement of said bolt means with said thread receiving means securely fastens the rail to the tie.

8. A railroad track assembly comprising a wooden tie, a flat bottomed rail supported by said tie, said wooden tie having a coating of thermoplastic material that impregnates and fills any voids and cracks in the tie and forms a relatively thin protective layer on all planar surfaces of the tie, a base plate carrying threaded fastening means, said tie having apertures spaced similarly to the fastening means on the base plate, said base plate being secured to the underside of the tie with the fastening means mating said apertures, a top plate located on top of the tie and having apertures mating said tie apertures, said top plate including means forming a channel for receiving the bottom of the rail, clip means having apertures mating the tie apertures and arms overlying said channel and the rail positioned therein, bolt means passing through the clip apertures, top plate apertures, and tie apertures, into threaded engagement with said bottom plate fastening means for securing the rail to the tie, and said clip arms having a resiliency which permits limited movement of said rail relative to said tie and base plate while securely maintain the said in mounted position.

9. The combination as set forth in claim 8 wherein the bottom plate is secured to the rail by means of said polypropylene.

10. The combination as set forth in claim 8 wherein the bottom plate carries four threaded fastening means, said apertures and threaded fastening means being arranged with two on each side of the rail, said clip means comprising two securing clips, one of said clips being located on each side of the rail so that said arms urge the rail into the channel in the top plate.

11. The combination as set forth in claim 8 wherein the threaded fastening means comprises a plurality of locking nuts affixed to the upper side of the bottom plate, the apertures in said tie being countersunk to receive said locking nuts so that the upper surface of said bottom plate is brought into bearing relationship with the underside of the tie.

12. The combination set forth in claim 8 in which said thermoplastic coating is polypropylene.

* * * * *